US008425642B2

(12) United States Patent
Worker et al.

(10) Patent No.: US 8,425,642 B2
(45) Date of Patent: Apr. 23, 2013

(54) CYCLONIC SEPARATING APPARATUS

(75) Inventors: David Colin Worker, Malmesbury (GB); Oliver Henry Sherston Chambers, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 209 days.

(21) Appl. No.: 13/030,786

(22) Filed: Feb. 18, 2011

(65) Prior Publication Data

US 2011/0209447 A1 Sep. 1, 2011

(30) Foreign Application Priority Data

Feb. 26, 2010 (GB) .................................. 1003284.5

(51) Int. Cl.
*B01D 45/12* (2006.01)

(52) U.S. Cl.
USPC ............... 55/345; 55/346; 55/349; 55/DIG. 3

(58) Field of Classification Search .................... 55/346, 55/349, DIG. 3
See application file for complete search history.

(56) References Cited

U.S. PATENT DOCUMENTS 4,726,902 A 2/1988 Hubbard
7,062,982 B2 * 6/2006 Coyle et al. ................ 73/863.23
7,497,899 B2 3/2009 Han et al.
7,563,297 B2 7/2009 Kim
7,828,866 B2 11/2010 Courtney et al.
2004/0069047 A1 * 4/2004 Coyle et al. .................. 73/28.04
2007/0084160 A1 4/2007 Kim
2010/0218338 A1 * 9/2010 McLeod ......................... 15/347

FOREIGN PATENT DOCUMENTS

GB 2460102 11/2009
JP 3-188823 8/1991
JP 2004-180760 7/2004
JP 2006-88139 4/2006
JP 2006-346669 12/2006
JP 2008-541816 11/2008

OTHER PUBLICATIONS

GB Search Report dated Jun. 25, 2010, directed to GB Patent Application No. 1003284.5; 1 page.

* cited by examiner

*Primary Examiner* — Jason M Greene
*Assistant Examiner* — Dung H Bui
(74) *Attorney, Agent, or Firm* — Morrison & Foerster LLP

(57) ABSTRACT

The present invention relates to a cyclonic separating apparatus and a vortex finder plate for use in a cyclonic separating apparatus, the vortex finder plate including a support structure and a plurality of vortex finder support flaps extending from the support structure, each vortex finder support flap comprising a vortex finder. At least one of the vortex finder support flaps is connected to the support structure by a hinge.

12 Claims, 23 Drawing Sheets

CYCLONIC SEPARATING APPARATUS

REFERENCE TO RELATED APPLICATIONS

This application claims the priority of United Kingdom Application No. 1003284.5, filed Feb. 26, 2010, the entire contents of which are incorporated herein by reference.

FIELD OF THE INVENTION

The present invention relates to a cyclonic separating apparatus and a vortex finder plate for use in a cyclonic separating apparatus.

BACKGROUND OF THE INVENTION

Vacuum cleaners are often made from parts which can be complicated and expensive to manufacture.

One such part is known as a "vortex finder plate". An exploded view of a prior art cyclonic separating apparatus comprising a vortex finder plate is shown in FIG. 1*a*. A perspective view of the vortex finder plate itself can be seen in FIG. 1*b* and a section through the vortex finder plate can be seen in FIG. 1*c*.

It can be seen that the cyclonic separating apparatus 1 comprises a plurality of cyclones 2 which are arranged in parallel in terms of airflow passing through the cyclones 2. Each cyclone 2 has an air inlet 4 and an air outlet 6. The air outlets 6 are in the form of so called "vortex finders" 8 which protrude through vortex finder apertures in a seal 9 into a top end of each cyclone 2. It can be seen that the vortex finders 8 are an integral part of the vortex finder plate 10.

As can be seen from FIG. 1*a* each of the plurality of cyclones 2 is angled such that their lower ends 12 point towards a central axis A of the cyclonic separating apparatus 1. This angling of the cyclones 2 is often done to minimize the overall size of the cyclonic separating apparatus 1. This angling of the cyclones 2 however has to be mirrored in the vortex finder plate 10 and vortex finders 8 so that a tight seal can be formed between the upper edges 14 of the cyclones 2 and the vortex finder plate 10. In order to achieve this and as can be seen in FIGS. 1*a* and 1*b* the vortex finder plate 10 is not flat, instead it is sloped towards its outer edge 16 in all directions. Each of the vortex finders 8 are also angled towards axis A. This means that the vortex finders 8 on the vortex finder plate 10 are all arranged at different angles to each other.

The manufacture of such a vortex finder plate 10 therefore poses a problem because each vortex finder 8 is pointing in a different direction and there is an undercut 18 between the lower surface 20 of the vortex finder plate 10 and each of the vortex finders 8. The tool 22 that is currently used to produce such vortex finder plates 10 is shown schematically in FIGS. 2*a* to 2*f*.

FIG. 2*a* shows an exploded view of a section through the tool 22 with the component parts moved into the open position. It can be seen that the tool 22 is very complex, comprising a lower core 24 having a plurality of separate lower core pins 26 which are used to form the inner surfaces of at least some of the vortex finders 8. The tool 22 also comprises a lifter section 28 which is necessary to deal with the undercuts 18 between the lower surface 20 of the vortex finder plate 10 and the vortex finders 8. This lifter section 28 will be explained in more detail later.

The tool 22 also comprises an upper cavity part 30 and a plurality of separate upper core pins 32.

To manufacture a vortex finder plate 10, all of the parts of the tool 22 are brought together to form a cavity 34 formed between the parts; this is the position shown in section in FIG. 2*b*. A molten plastics material is forced into the cavity 34, for example by injection molding. The molten plastics material is left to solidify to form the vortex finder plate 10. Once the vortex finder plate 10 has solidified within the cavity 34, it then has to be removed from the tool 22.

The sequence of movements of the parts of the tool 22, necessary for removal of the formed vortex finder plate 10, is shown in FIGS. 2*c* to 2*f*. For clarity the formed vortex finder plate 10 is not shown.

In FIG. 2*c* it can be seen that the first action needed to remove the formed vortex finder plate 10 is to lift the upper core pins 32 such that their lower ends 36 are freed from their position inside the newly formed vortex finders 8. Since each vortex finder 8 is at a different angle the upper core pins 32 cannot simply be moved upwardly, instead each upper core pin 32 has to be removed upwardly and outwardly. It is for this reason that the upper core pins 32 have to be separate from each other and from the upper cavity part 30.

After the upper core pins 32 have been moved, the upper cavity part 30 is lifted from the lower core part 24 as shown in FIG. 2*d*. The next step is shown in FIG. 2*e* and comprises lowering the lower core pins 26. Again because each vortex finder 8 is at a different angle the lower core pins 26 cannot simply be moved downwardly, instead each lower core pin 26 has to be removed downwardly and inwardly. Again it is for this reason that the lower core pins 26 have to be separate from each other and from the lower core part 24.

After the lower core pins 26 have been moved it is then necessary to move the lifter sections 28 in an upward and inward direction so that the formed vortex finder plate 10 can be released from the tool 22. These lifter sections 28 are necessary because of the undercut 18 formed between each of the vortex finders 8 and the lower surface 20 of the vortex finder plate 10. This problem can be visualized best in FIG. 2*e* where the formed vortex finder plate 10 would be positioned on the upper surface 44 of the lower core part 24 with the vortex finders 8 located in the cavities 38. As can be seen in FIG. 2*e* if the lower central part of the tool 22, which is formed from the lifter sections 28 and a lower central core part 40, was formed in one piece it would be trapped between the inwardly pointing vortex finders 8 and therefore it would be impossible to remove the formed vortex finder plate 10 from the lower core part 24.

As shown in FIG. 2*f* the solution to this problem is to use the lifter sections 28 which are arranged to be moveable in an upwardly and inwardly direction. The lifter sections 28 are normally moved using mechanical arms which for clarity are not shown in the Figures but they could be moved by any suitable means. Moving the lifter sections 28 upwardly and inwardly to the position shown in FIG. 2*f* will cause the vortex finder plate 10 to lift off from the upper surface 44 of the lower core part 24 and the lifter sections 28 to move out of the undercuts 18. The vortex finder plate 10 would then be free from the tool 22.

Such a tool 22 is therefore expensive to make and the process for making each vortex finder plate 10 using the tool 22 is complex. Alternative vortex finder plates which could be manufactured more easily would therefore be desirable.

The problems associated with making a vortex finder plate can become even more complex if it is desired to integrate other components of a cyclonic separating apparatus with the vortex finder plate.

SUMMARY OF THE INVENTION

A first aspect of the present invention provides a vortex finder plate for use in a cyclonic separating apparatus comprising a support structure and a plurality of vortex finder support flaps extending from the support structure, each vortex finder support flap comprising a vortex finder, characterized in that at least one vortex finder support flap is connected to the support structure by a hinge.

Advantageously such a vortex finder plate can be manufactured in a first position where the vortex finder support flap is in the same or substantially the same plane as the support structure and the vortex finder is at or substantially at 90 degrees to the support structure. After manufacture the vortex finder support flap can be moved into a second position where the vortex finder support flap is bent about its hinge and the vortex finder is angled towards a central axis of the vortex finder plate.

This means that there is no undercut to deal with during manufacture making production of the vortex finder plate simpler and cheaper.

In a preferred embodiment each vortex finder support flap may be connected to the support structure by a hinge. In such an embodiment the tool used to make the vortex finder plate does not require any lifter sections.

At least one hinge may be in the form of an area of reduced thickness between a vortex finder support flap and the support structure. Alternatively at least one hinge may be in the form of a scored line between a vortex finder support flap and the support structure. Preferably the vortex finder support flaps may be able to independently move about their hinges between the first and second positions.

In a particular embodiment the vortex finder plate may further comprise an air duct. The air duct may, for example, extend downwardly from the center of the support structure.

Preferably one or more of the following components may be formed integrally as one piece, the vortex finder flaps, the support structure, the hinge(s), the vortex finders and the air duct. In a preferred embodiment the vortex finder plate may be formed from a rigid material such that the vortex finder support flaps can only flex about the hinge(s).

In a preferred embodiment the plurality of vortex finder support flaps may extend outwardly from the support structure. Alternatively they may extend inwardly from the support structure.

A second aspect of the present invention provides a cyclonic separating apparatus comprising, a plurality of cyclones arranged in parallel, each cyclone comprising an air inlet and an air outlet, a vortex finder plate comprising a support structure and a plurality of vortex finder support flaps extending from the support structure, each vortex finder support flap supporting a downwardly extending vortex finder, the vortex finder plate being arranged such that an end of each cyclone is covered by a vortex finder support flap such that a vortex finder protrudes into each cyclone forming the air outlet of the cyclone, characterized in that at least one vortex finder support flap is connected to the support structure by a hinge.

When used in relation to the cyclones the term "in parallel" shall be taken to mean in terms of airflow passing through the cyclones.

Preferred aspects of the vortex finder plate may be as described in relation to the first aspect of the present invention.

A seal may be arranged between the plurality of cyclones and the vortex finder plate. Additionally or alternatively an exhaust manifold may be positioned above the vortex finder plate such that the vortex finder plate is sandwiched between the plurality of cyclones and the exhaust manifold.

The plurality of cyclones may be angled towards a longitudinal axis of the cyclonic separating apparatus. In such an embodiment the vortex finder support flaps may be bent about their hinges.

The plurality of cyclones may be arranged around an air duct in the cyclonic separating apparatus. The air duct may contain at least one filter, for example a sock filter, elongate filter or electrostatic filter.

BRIEF DESCRIPTION OF THE DRAWINGS

Preferred embodiments of a surface treating appliance and vortex finder plates according to the present invention will now be described in detail with reference to the accompanying drawings in which.

DETAILED DESCRIPTION OF THE INVENTION

Figure 1A:
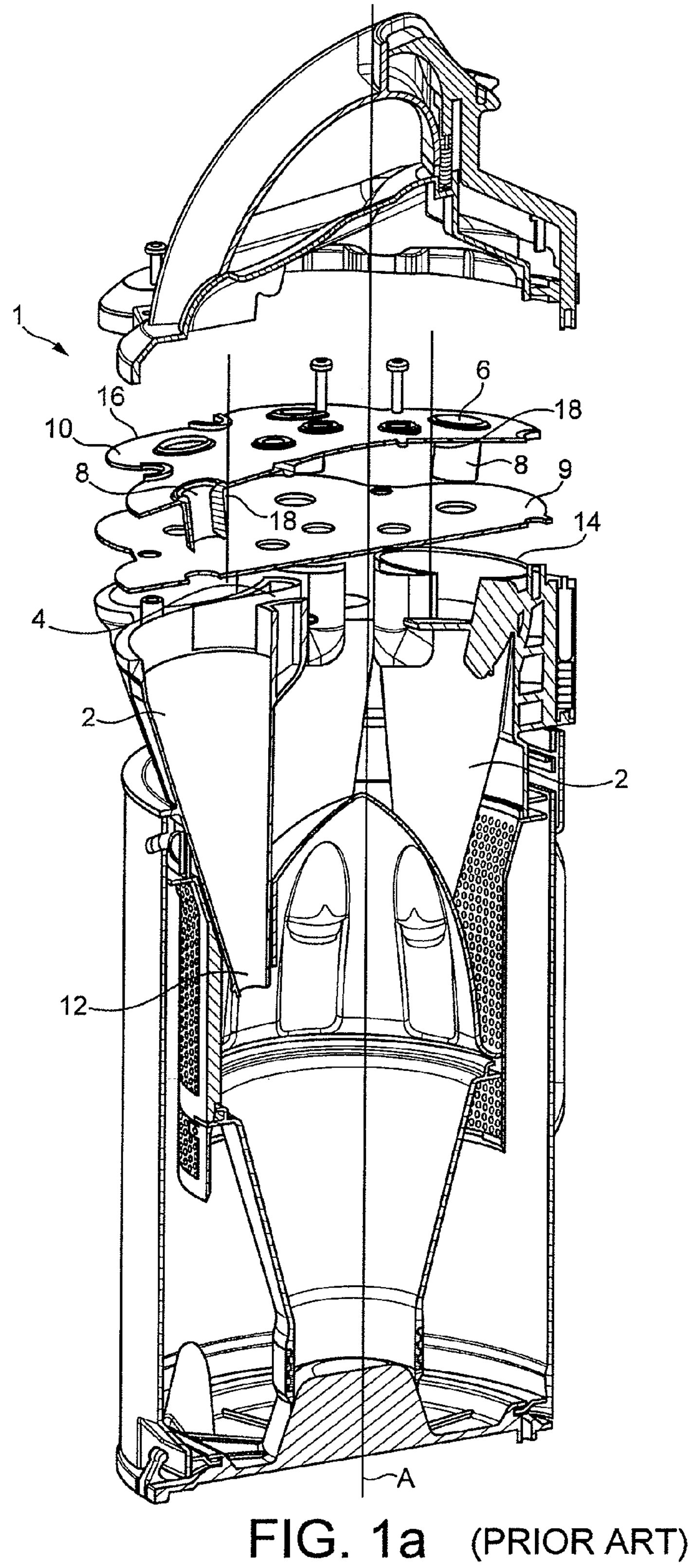
FIG. 1a (PRIOR ART)
FIG. 1*a* shows an exploded section through a prior art cyclonic separating apparatus comprising a vortex finder plate.
Figure 1B:
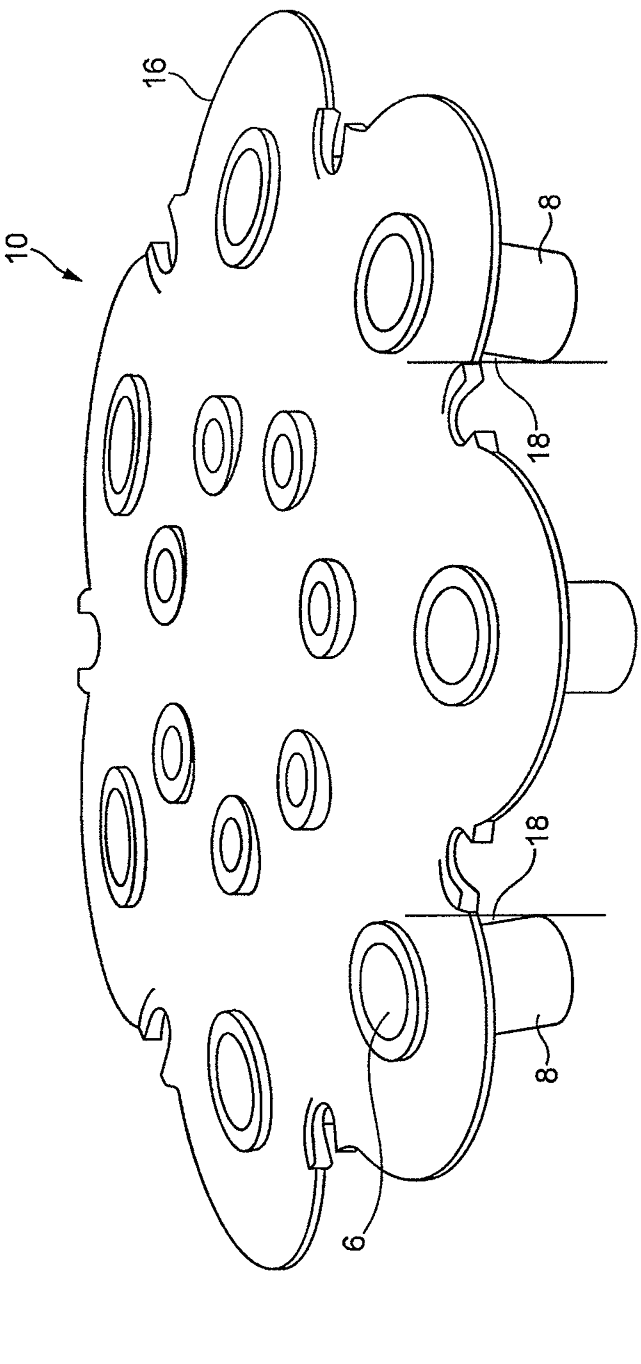
FIG. 1b (PRIOR ART)
FIG. 1*b* shows a perspective view of the vortex finder plate shown in FIG. 1*a;*
Figure 1C:
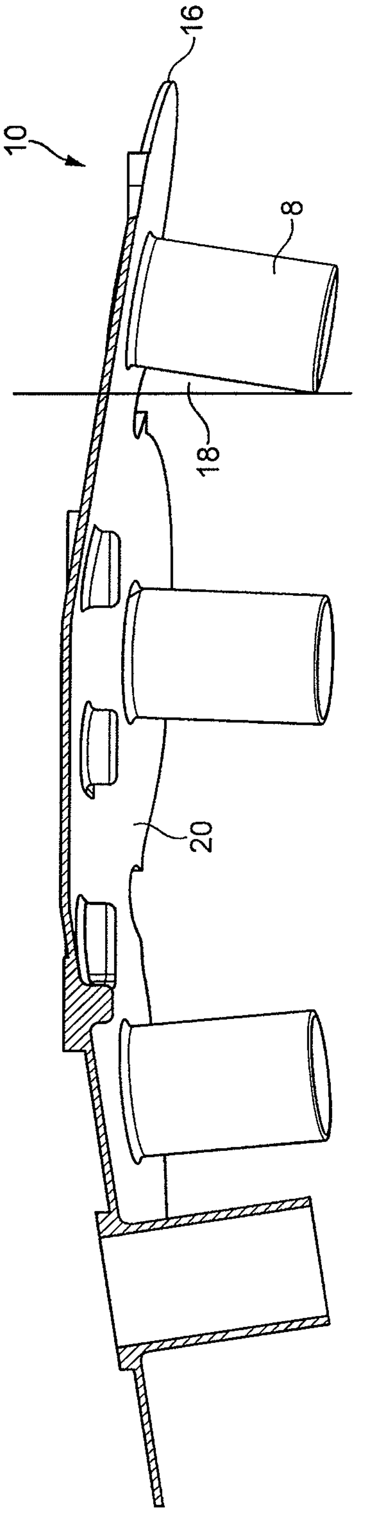
FIG. 1c (PRIOR ART)
FIG. 1*c* shows a section through the vortex finder plate shown in FIGS. 1*a* and 1*b;*
Figure 2A:
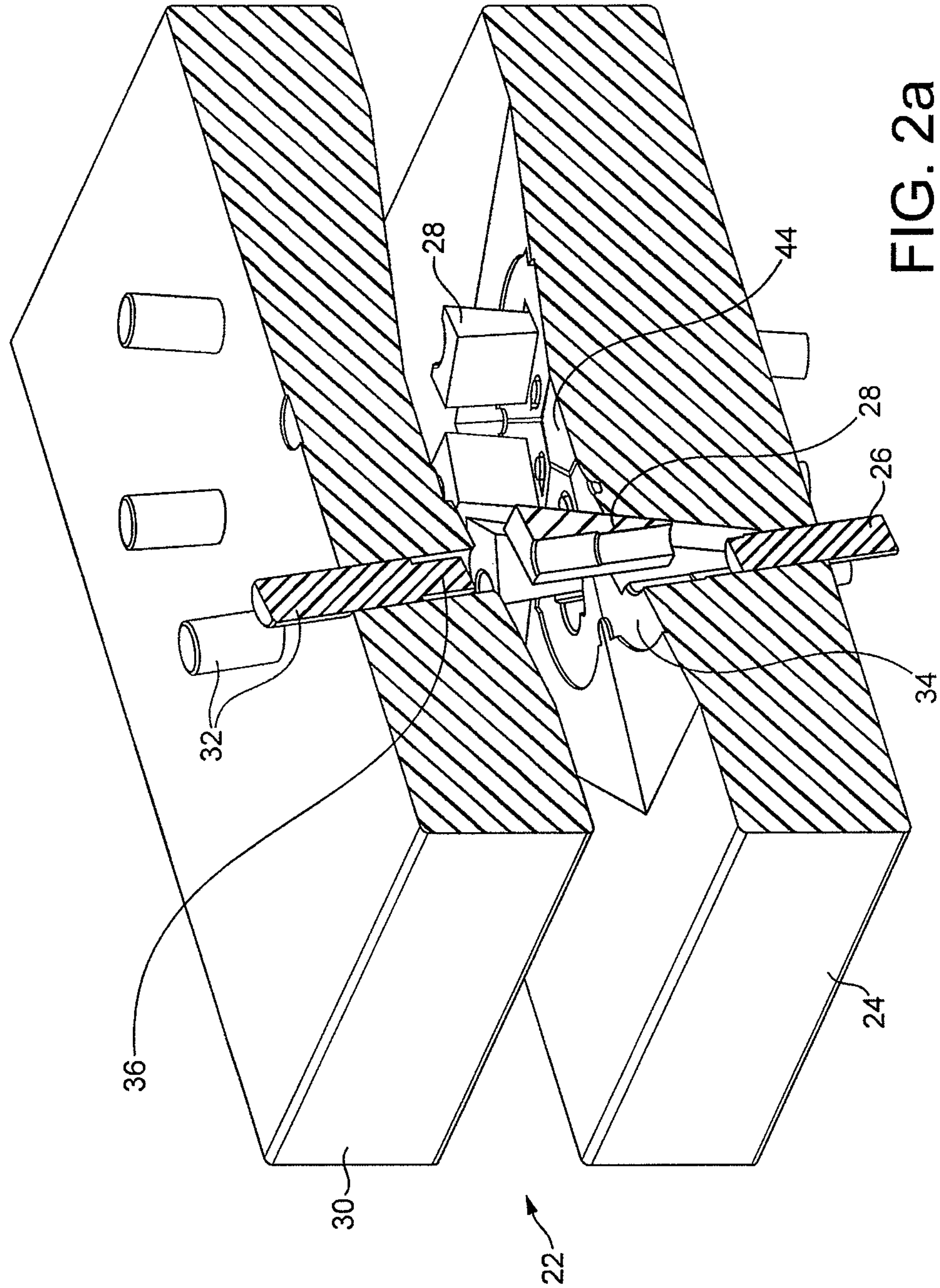
FIG. 2a (PRIOR ART)
FIG. 2*a* shows an exploded schematic section through a tool for manufacturing the vortex finder plate shown in FIGS. 1*a* to 1*c;*
Figure 2B:
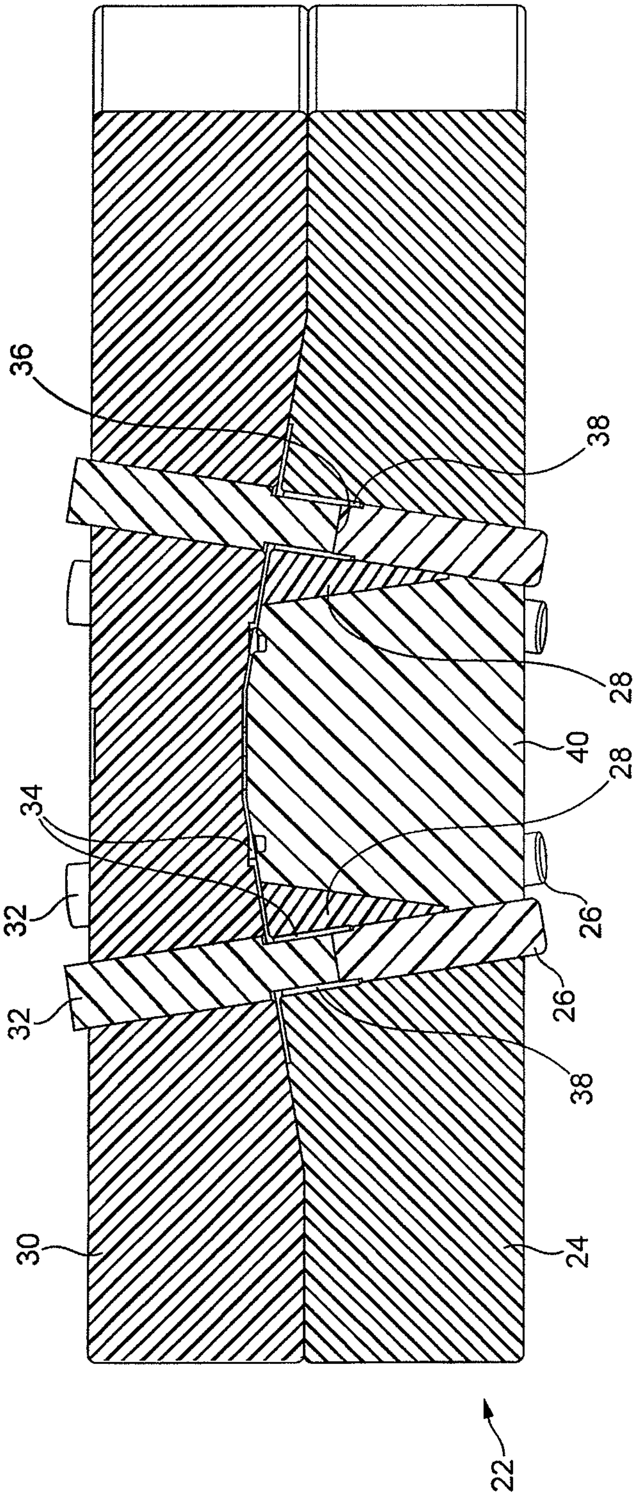
FIG. 2b (PRIOR ART)
FIG. 2*b* shows a section through the tool shown in FIG. 2*a* in the closed position.
Figure 2C:
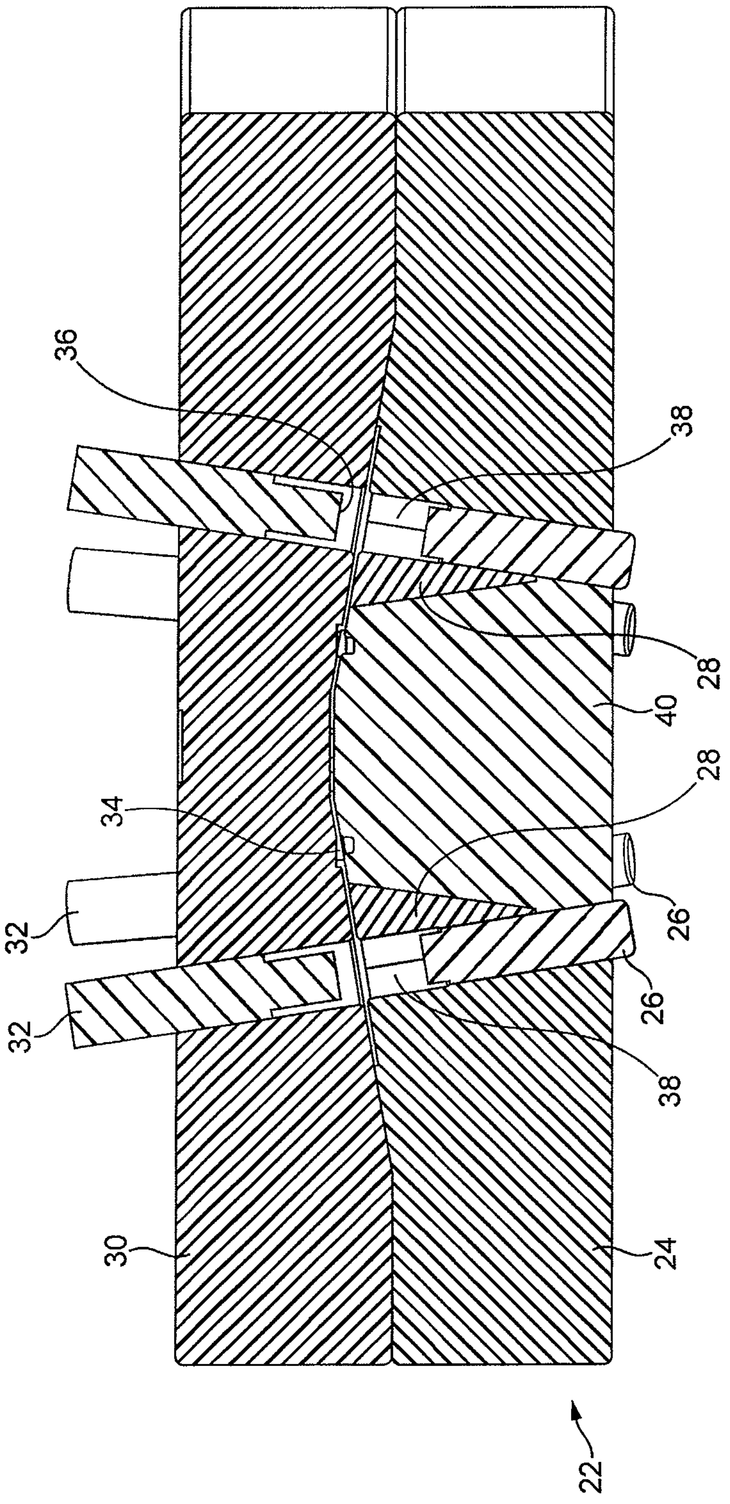
FIG. 2c (PRIOR ART)
FIGS. 2*c* to 2*f* show the sequence of positions through which the tool must move to release a newly manufactured vortex finder plate as shown in FIG. 1*b;*
Figure 2D:
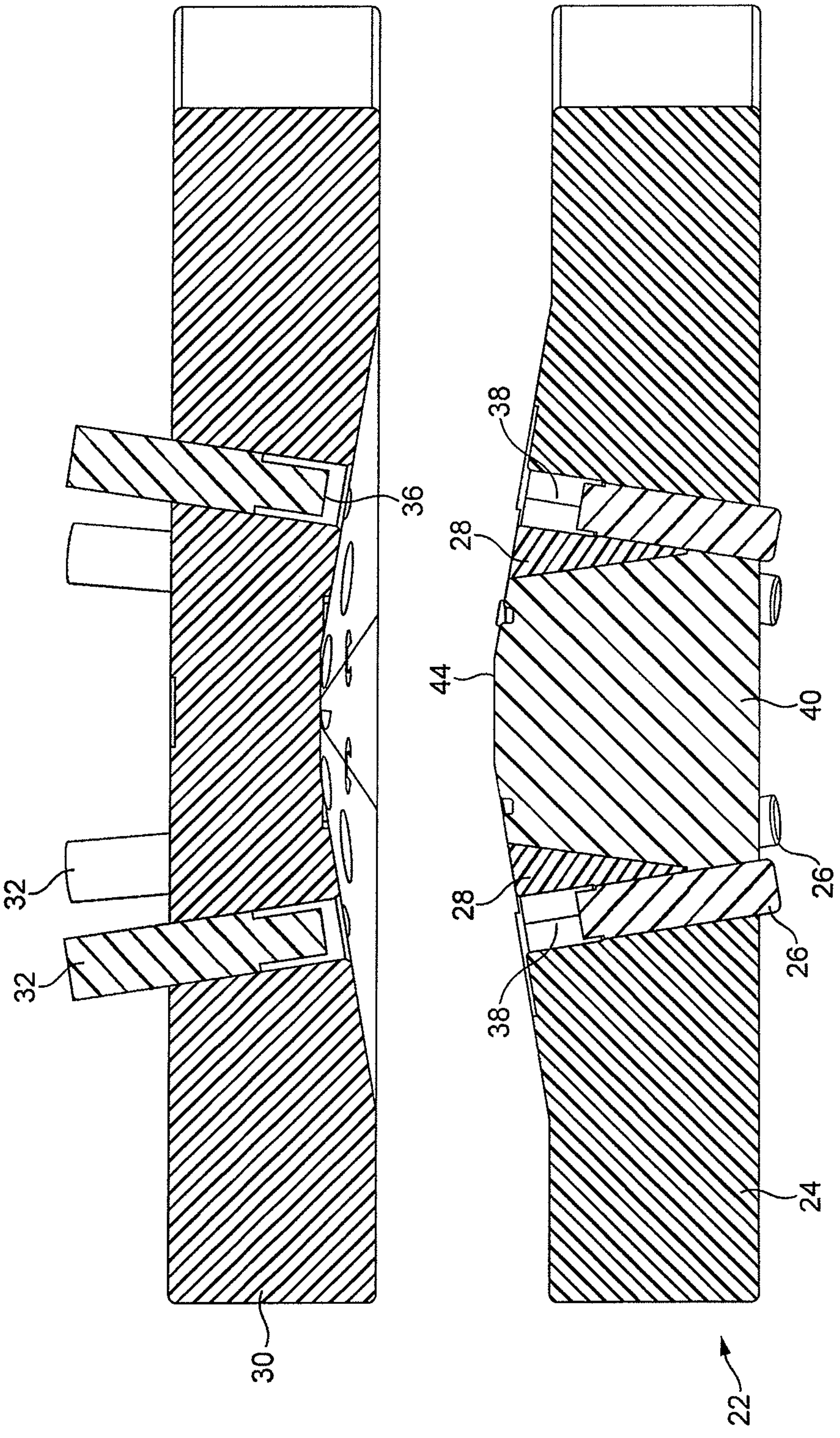
FIG. 2d (PRIOR ART)
Figure 2E:
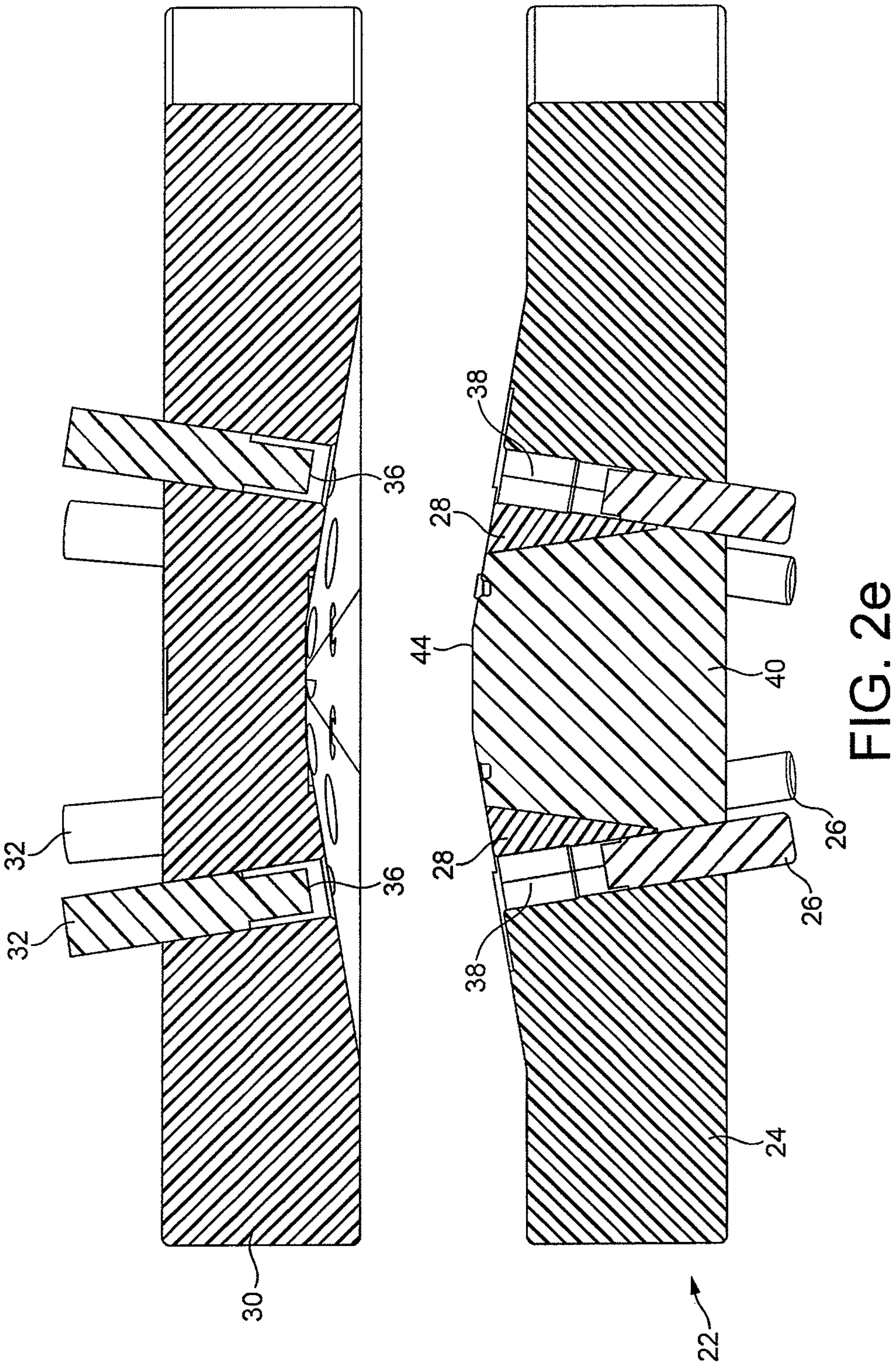
FIG. 2e (PRIOR ART)
Figure 2F:
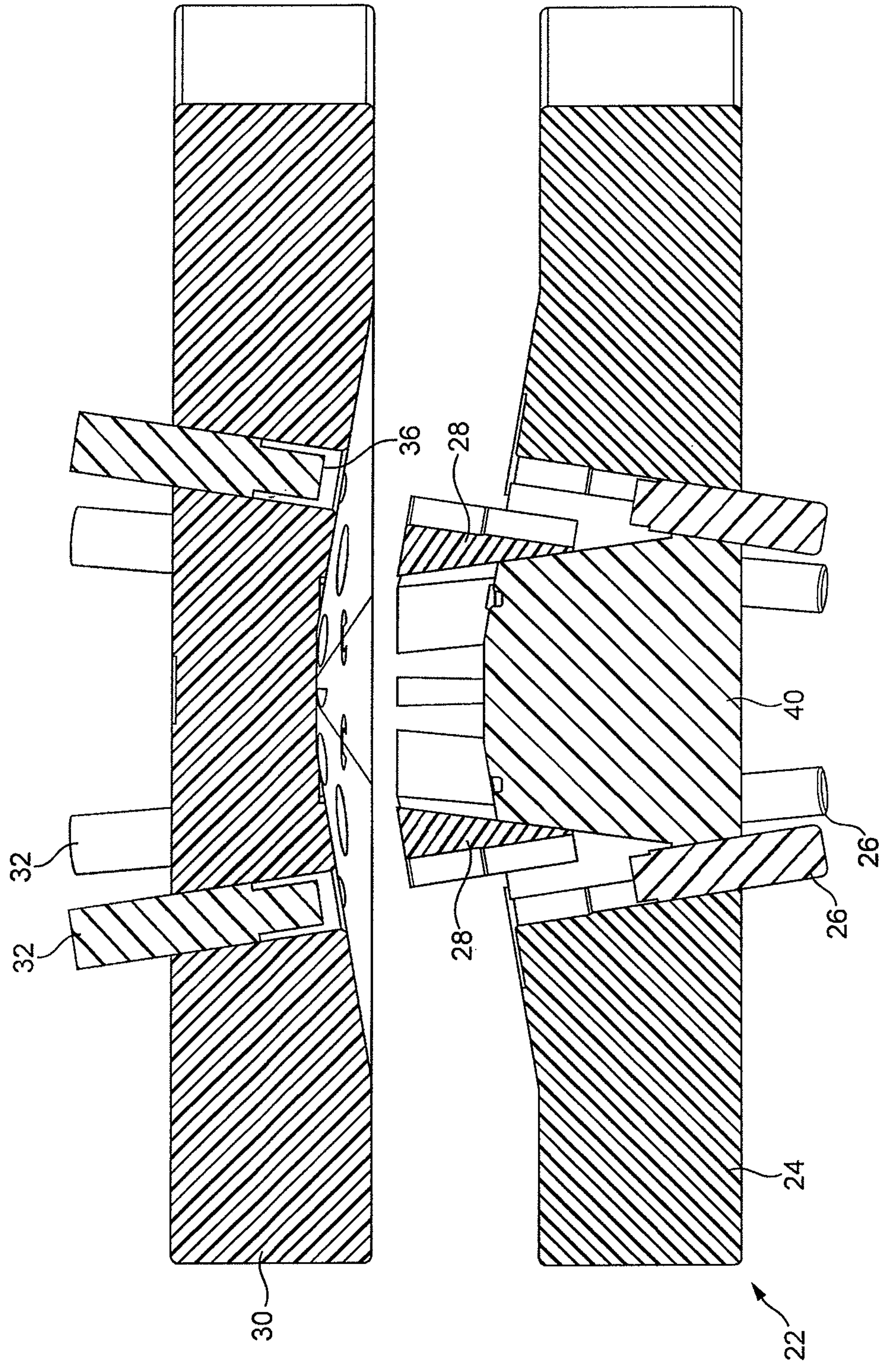
FIG. 2f (PRIOR ART)
Figure 3A:
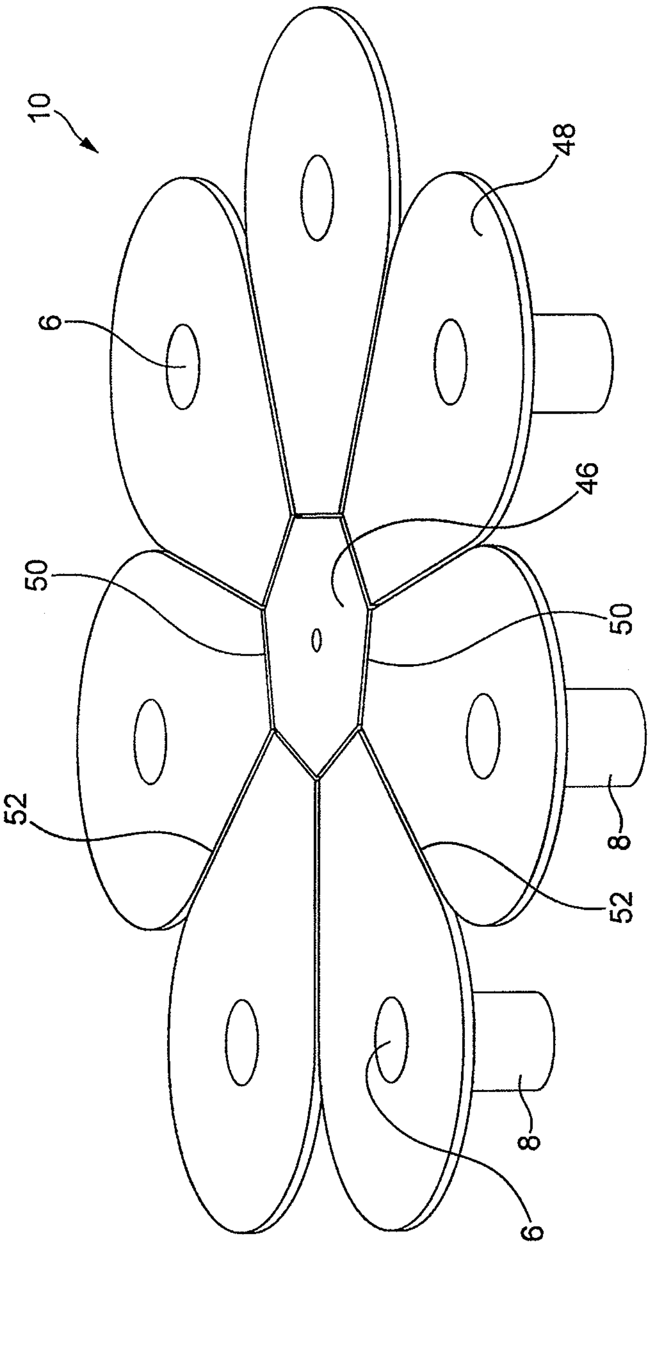
FIG. 3*a* shows a first embodiment of a vortex finder plate according the present invention, in its first position.
Figure 3B:
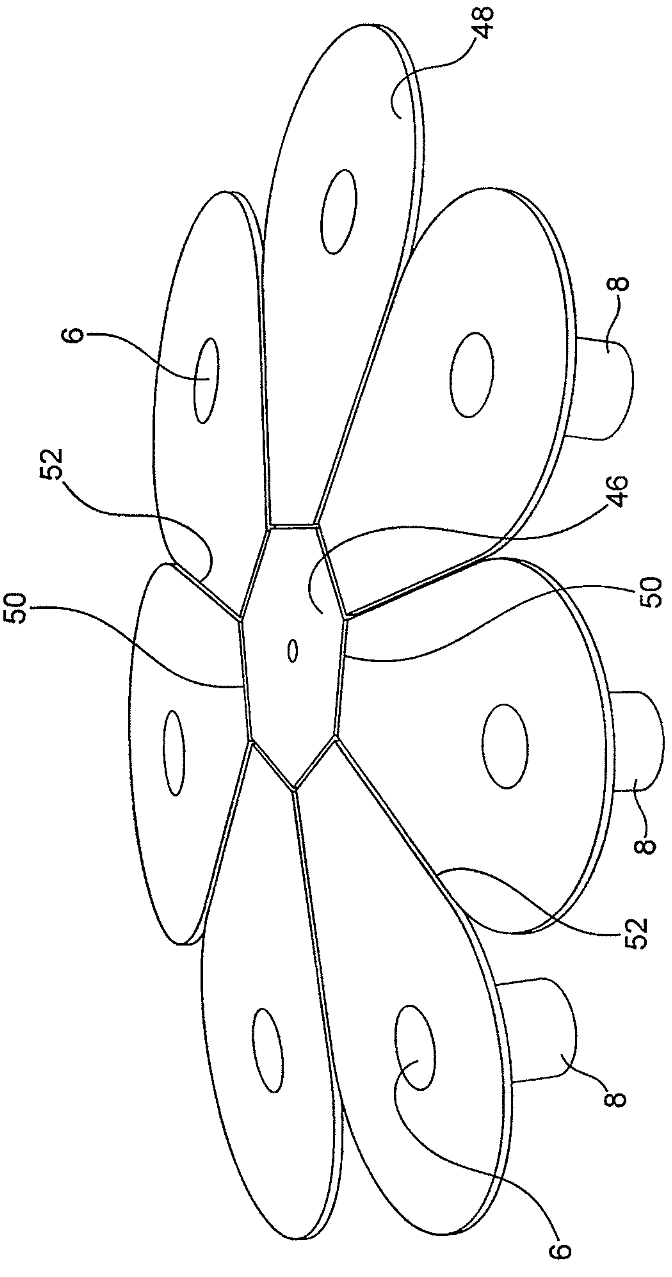
FIG. 3*b* shows the vortex finder plate shown in FIG. 3*a* in its second position.

With reference to FIGS. 3*a* and 3*b* the structure of a vortex finder plate 10 according to a first embodiment of the present invention is shown. The vortex finder plate 10 comprises a support structure 46 and a plurality of vortex finder support flaps 48. A single vortex finder 8 projects downwardly from each vortex finder support flap 48. A hinge 50 in the form of an area or line of reduced thickness is provided between the support structure 46 and each of the vortex finder support flaps 48. The vortex finder support flaps 48 are not connected to each other. There may, for example, be a split line or a gap 52 between adjacent vortex finder support flaps 48. This arrangement allows the vortex finder support flaps 48 to move or flex about their hinges 50 such that the vortex finder plate 10 can be manufactured in the first position shown in FIG. 3*a* and then after manufacture the vortex finder support flaps 48 can be moved about their respective hinges 50 into the second position shown in FIG. 3*b*. In FIG. 3*b* it can be seen that the vortex finders 8 are angled inwardly and each vortex finder support flap 48 is inclined downwardly. The vortex finder plate 10, in its second position, is therefore arranged such that it would fit onto a set of angled cyclones 2 such as those shown in FIG. 1*a*.

Figure 4A:
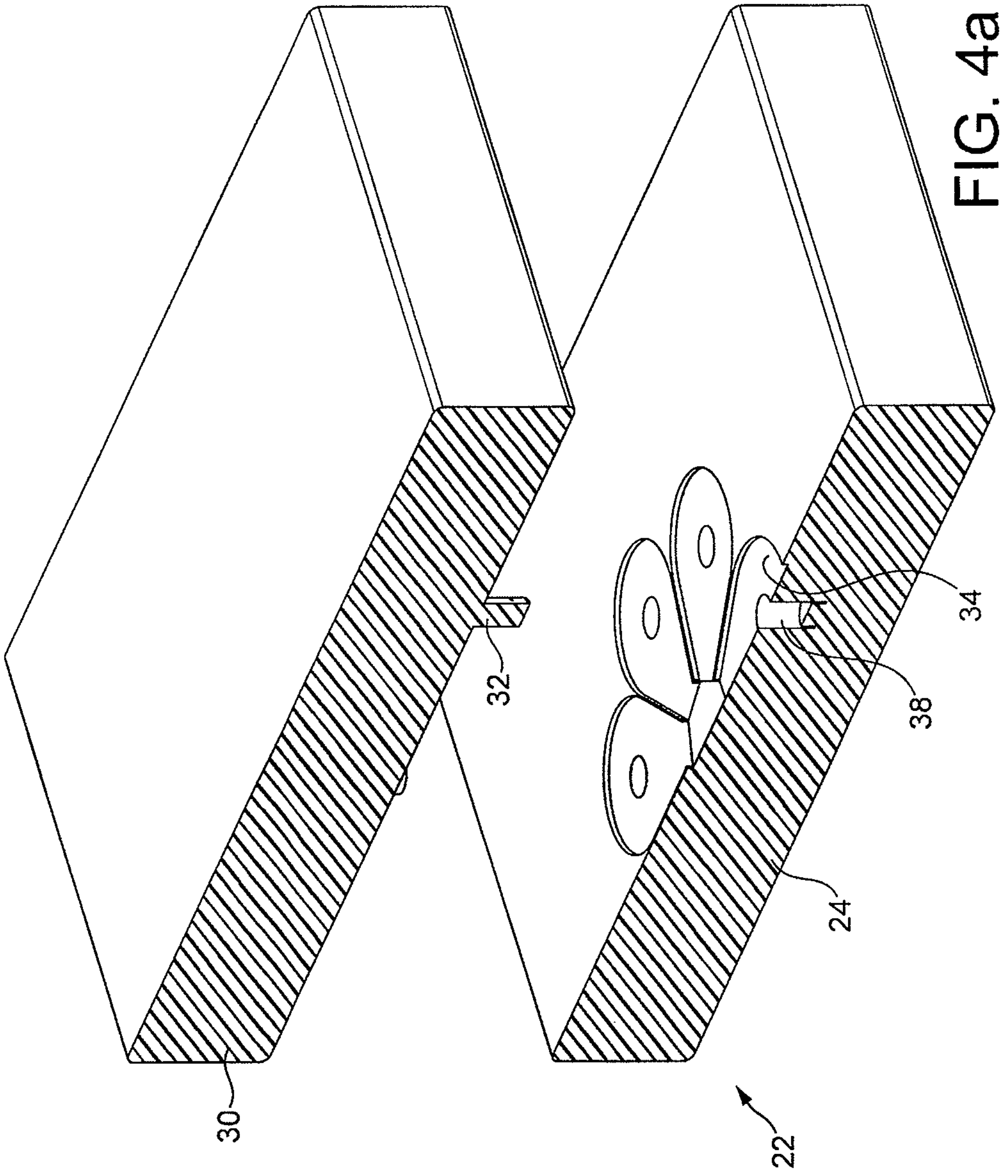
FIG. 4*a* shows an exploded schematic section through a tool for manufacturing the vortex finder plate shown in FIGS. 3*a* and 3*b;*
Figure 4B:
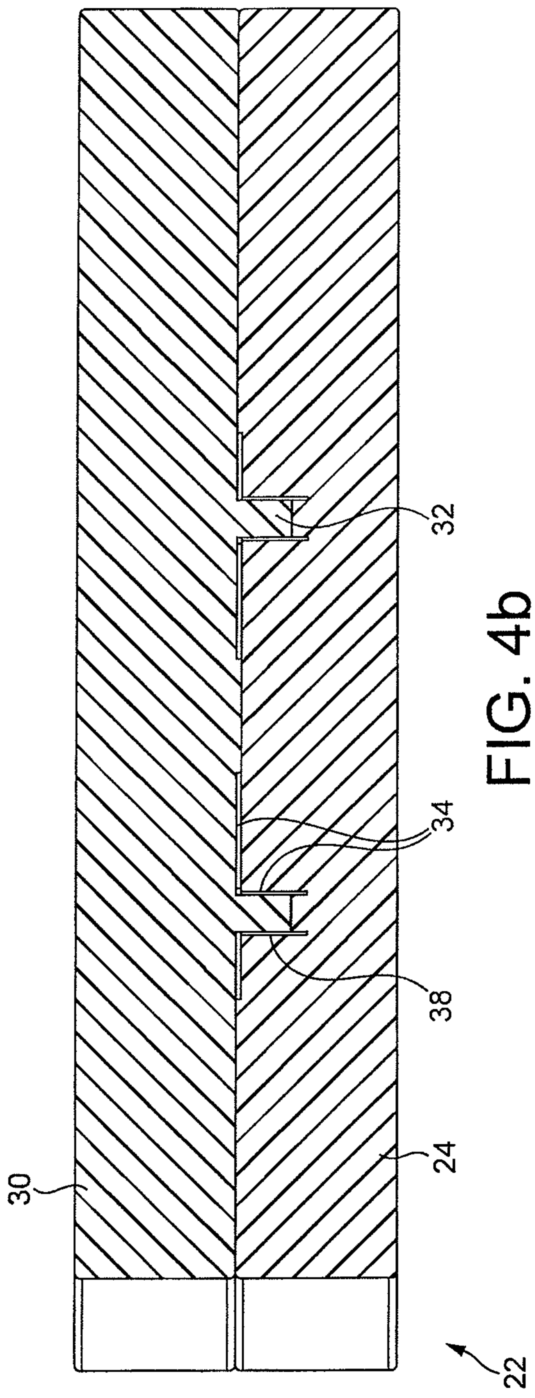
FIGS. 4*b* and 4*c* show the sequence of positions through which the tool must move to release a newly manufactured vortex finder plate as shown in FIGS. 3*a* and 3*b;*
Figure 4C:
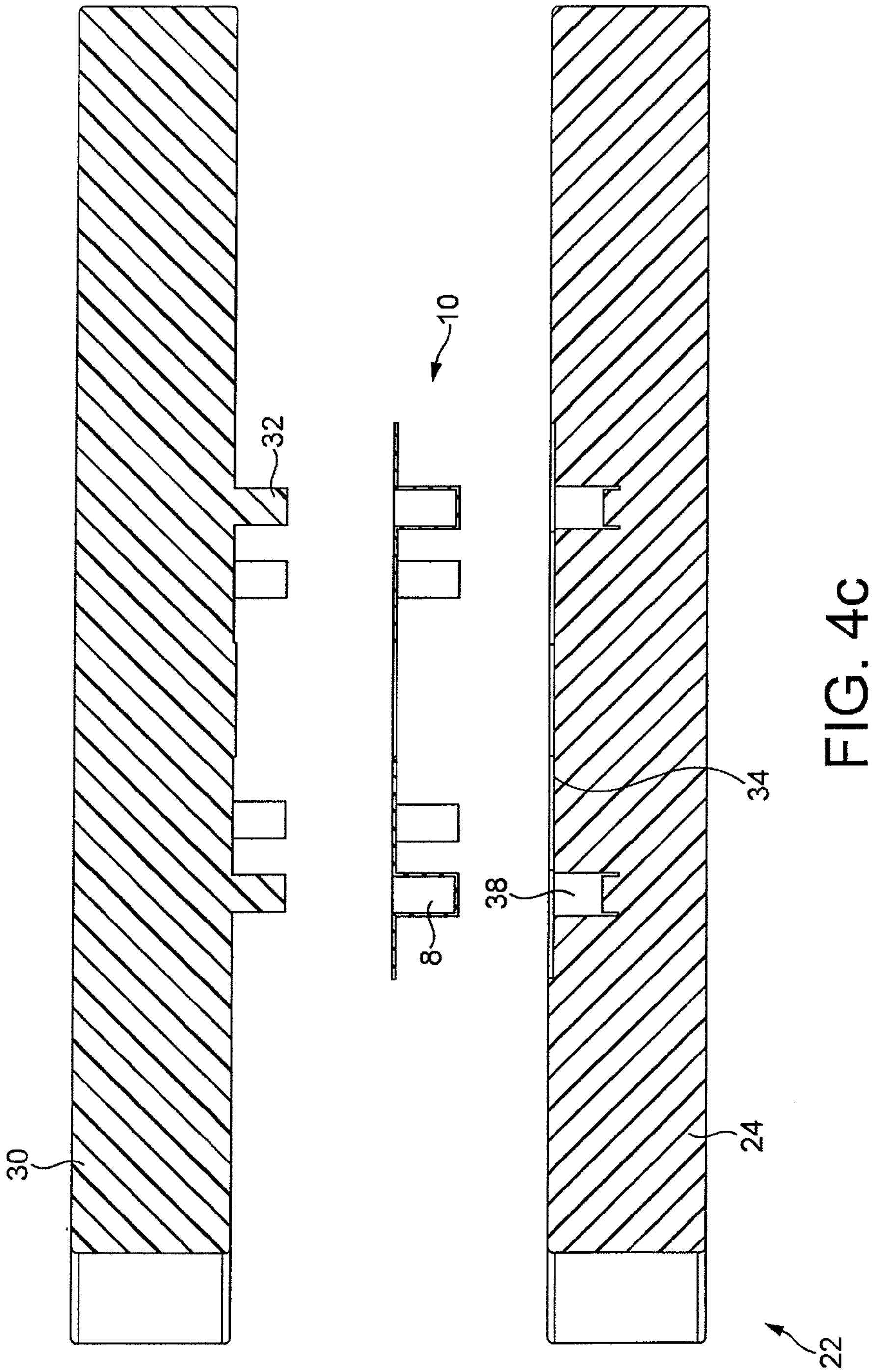

Such a vortex finder plate 10 is very advantageous as it is much easier to manufacture than previous vortex finder plates. FIGS. 4*a* to 4*c* illustrate an example of a tool 22 which could be used to make the vortex finder plate 10 shown in FIGS. 3*a* and 3*b*. FIG. 4*a* shows an exploded view of the tool 22 which can be seen to comprise a lower core part 24 and an upper cavity part 30. The upper cavity part 30 can be seen to comprise integral upper core pins 32. The vortex finder plate 10 can therefore be made from simple up and down movements of these parts without the need for any separate core pins or lifter sections.

To manufacture this vortex finder plate 10, the lower core part 24 and the upper cavity part 30 are brought together to form a cavity 34 between the parts, this is the position shown in section in FIG. 4*b*. A molten plastics material is forced into the cavity 34, for example by injection molding. The molten plastics material is left to solidify to form the vortex finder plate 10. Once the vortex finder plate 10 has solidified within the cavity 34, it then has to be removed from the tool 22.

Unlike in the prior art where a complex sequence of movements is required to remove the vortex finder plate 10, the removal of this new vortex finder plate 10 is very simple. As can be seen in FIG. 4*c* the lower core part 24 and the upper cavity part 30 are simply pulled apart to release the vortex finder plate 10.

FIGS. 5*a* to 5*d* show a second embodiment of vortex finder plate 10 according to the present invention. It can be seen that the vortex finder plate 10 comprises a ring shaped support structure 46, a plurality vortex finder support flaps 48 and a downwardly extending air duct 54. A single vortex finder 8 projects downwardly from each vortex finder support flap 48. A hinge 50 in the form of an area or line of reduced thickness is provided between the support structure 46 and each of the vortex finder support flaps 48. The vortex finder support flaps 48 are not connected to each other. There may therefore be a split or gap 52 between adjacent vortex finder support flaps 48. This arrangement allows the vortex finder support flaps 48 to move or flex about their hinges 50 such that the vortex finder plate 10 can be manufactured in the first position shown in FIGS. 5*a* and 5*b*, and then after manufacture the vortex finder support flaps 48 can be moved about their respective hinges 50 into the second position shown in FIGS. 5*c* and 5*d*. It can be seen in FIGS. 5*c* and 5*d* that the vortex finders 8 are now angled such that they would fit onto a set of angled cyclones 2, such as those shown in FIGS. 6*a* to 6*d*.

Figure 5A:
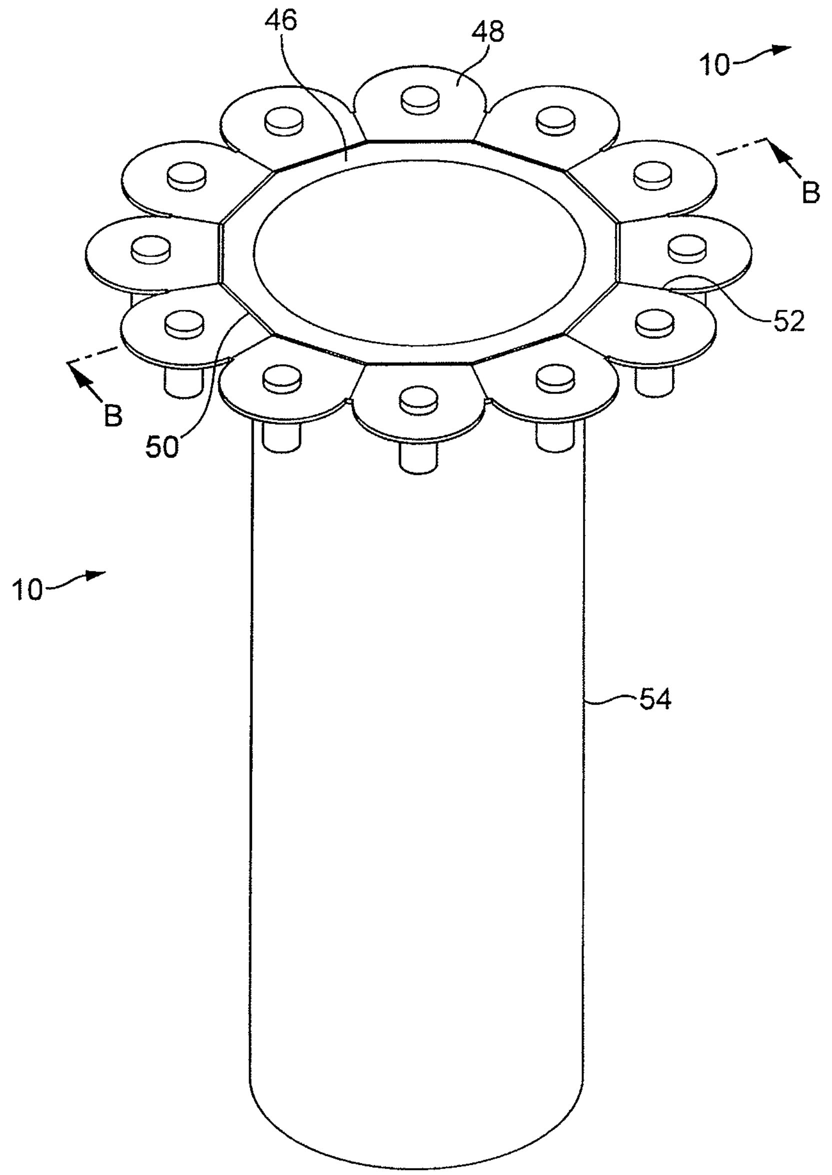
FIG. 5*a* shows a second embodiment of a vortex finder plate according the present invention, in its first position.
Figure 5B:
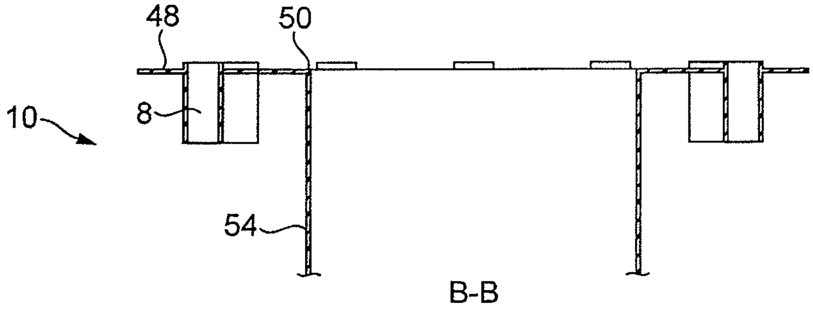
FIG. 5*b* shows a section through the vortex finder plate shown in FIG. 5*a;*
Figure 5C:
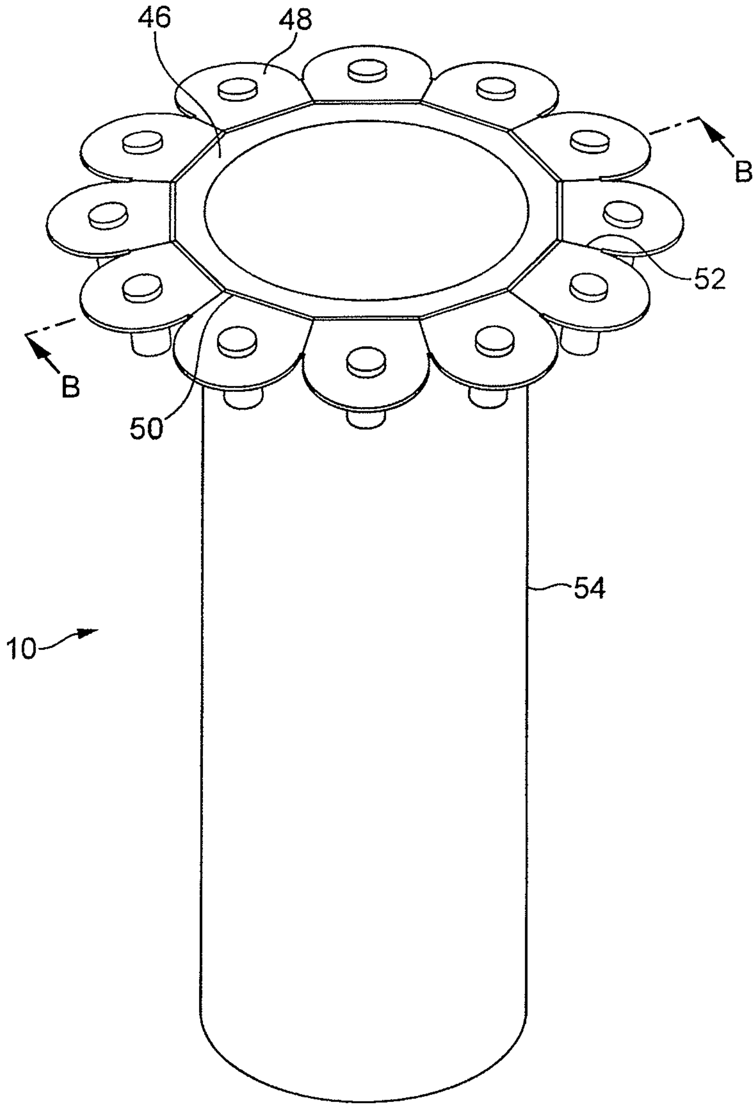
FIG. 5*c* shows the vortex finder plate shown in FIGS. 5*a* and 5*b* in its second position.
Figure 5D:
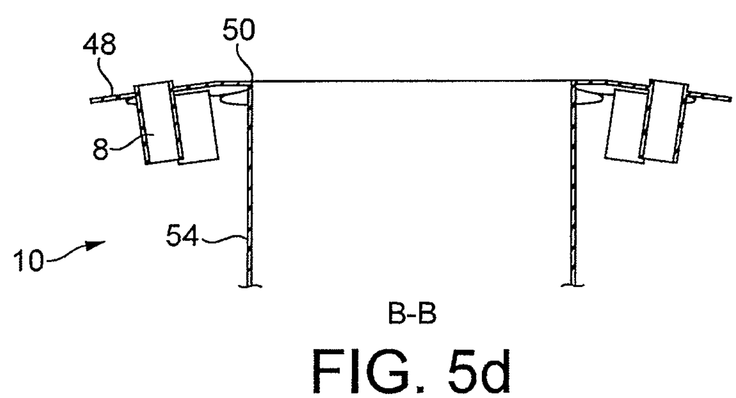
FIG. 5*d* shows a section through the vortex finder plate shown in FIG. 5*c;*
Figure 6A:
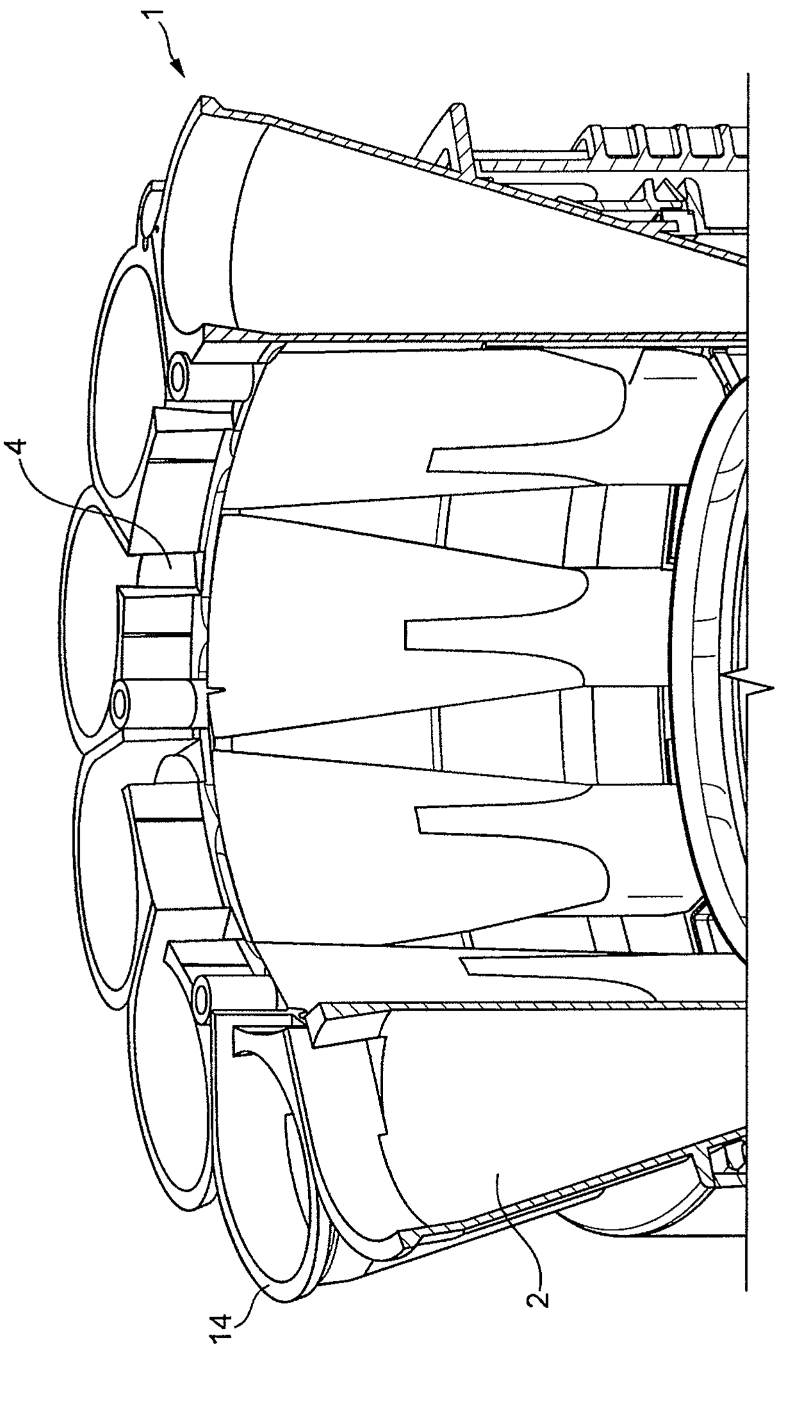
FIG. 6*a* shows a partial section through the parallel cyclones of a cyclonic separating apparatus.
Figure 6B:
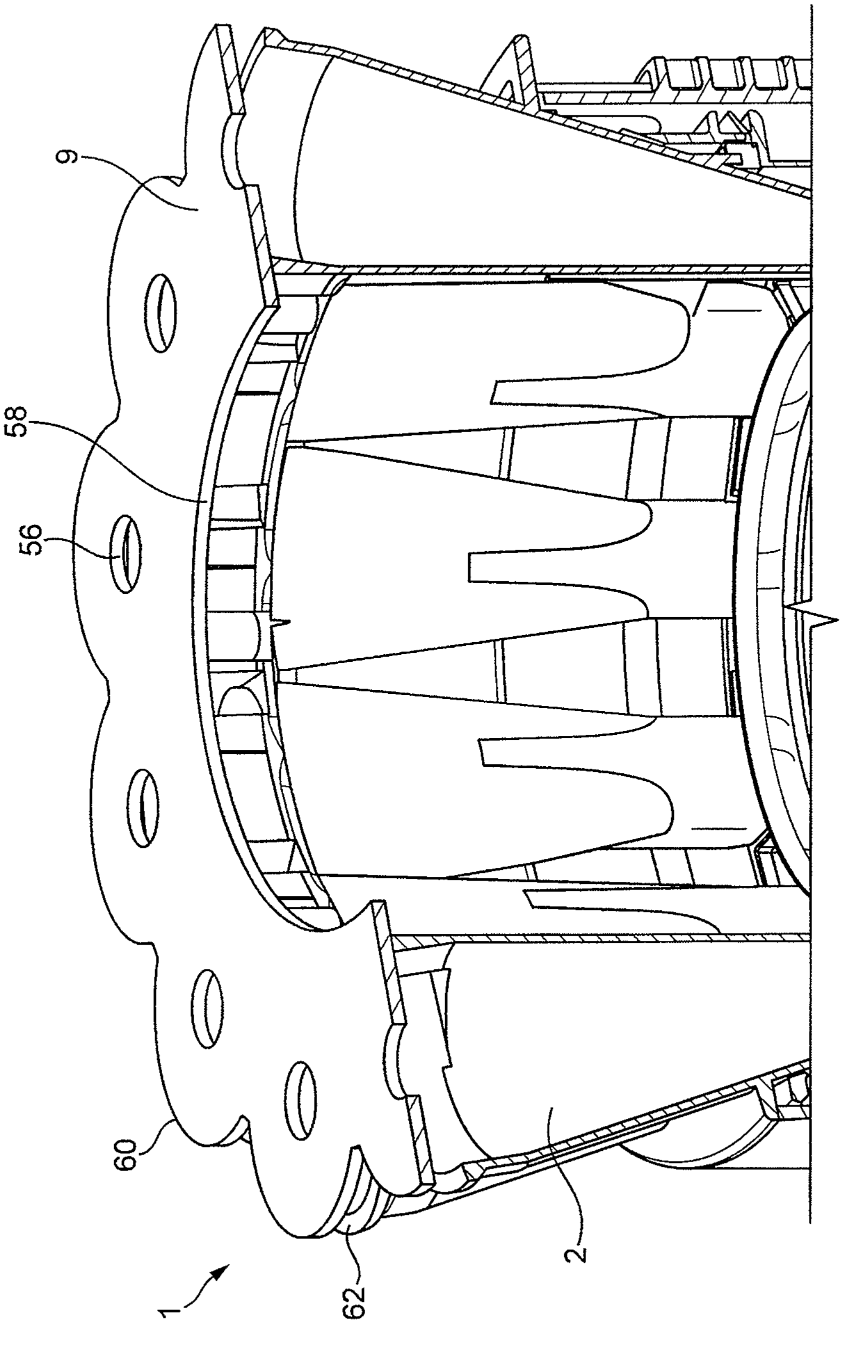
FIGS. 6*b* to 6*d* show the steps fitting the vortex finder plate shown in FIGS. 5*a* to 5*d* to the cyclones shown in FIG. 6*a;*

FIGS. 6*a* to 6*d* show part of a construction sequence for a cyclonic separating apparatus having a plurality of angled cyclones 2. A vortex finder plate 10 as shown in FIGS. 5*a* and 5*b* is used in the construction. As can be seen in FIG. 6*a* the cyclonic separating apparatus 1 comprises a plurality of inclined cyclones 2 which are arranged in a circle. The first step in the construction of the cyclonic separating apparatus 1 is to take the plurality of cyclones as shown in FIG. 6*a* and place on the upper edges 14 of the cyclones 2 a seal 9. The seal 9 is shown in FIG. 6*b* and can be seen to comprise a plurality of vortex finder apertures 56 surrounding a central air duct aperture 58. The vortex finder apertures 56 are arranged such that one lies centrally above each cyclone 2 and the central air duct aperture 58 is arranged centrally of the cyclonic separating apparatus 1. The outer edge 60 of the seal 9 is shaped to match the outer edges 62 of the cyclones 2.

Figure 6C:
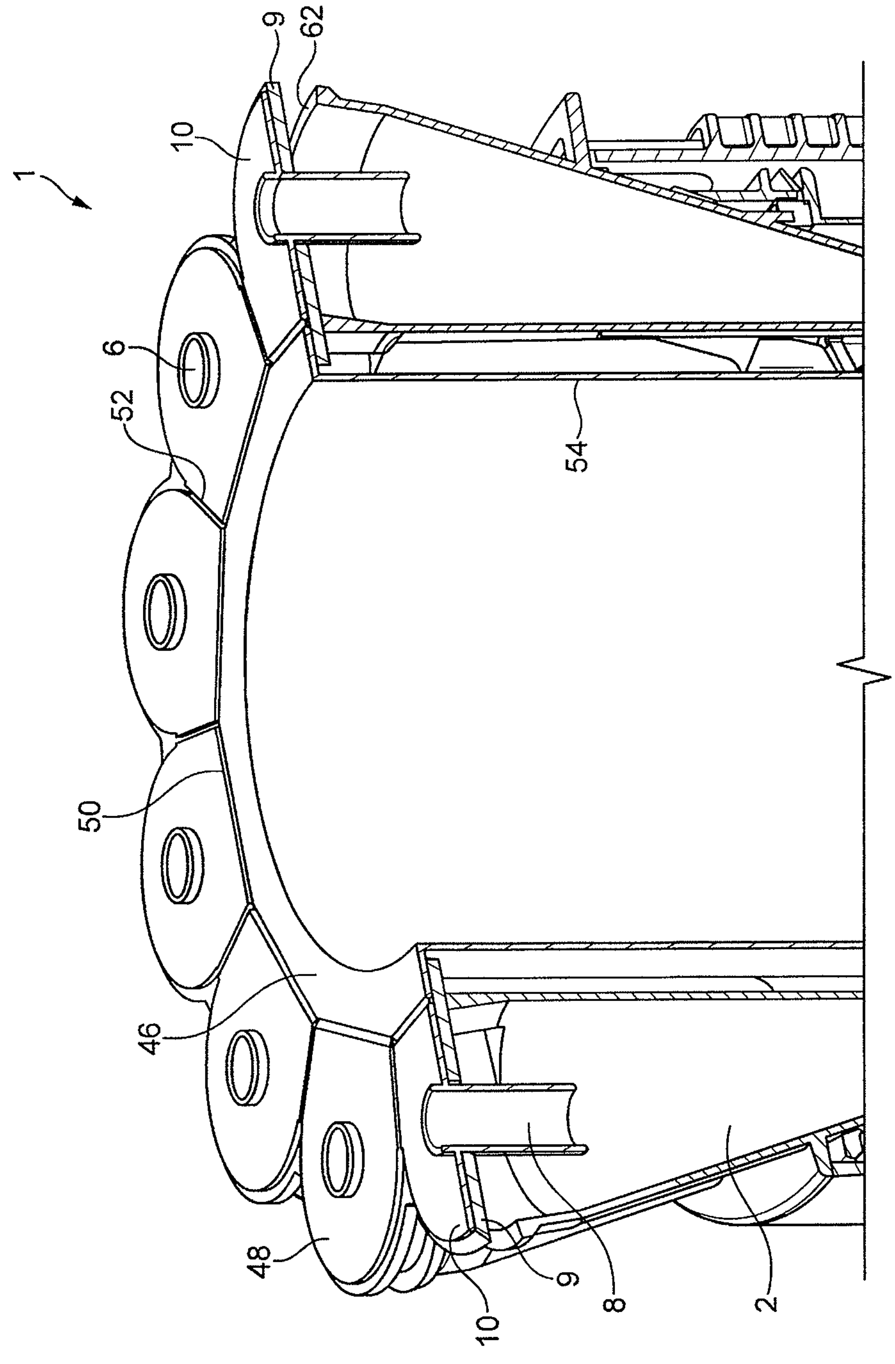

In the next step, as shown in FIG. 6*c* the vortex finder plate 10 is placed on top of the seal 9 such that the vortex finders 8 protrude through the vortex finder apertures 56 and the air duct 54 protrudes through the central air duct aperture 58. It can be seen that in this position because the vortex finder plate 10 is flat it is not completely in contact with the upper edges 14 of the cyclones 2.

Figure 6D:
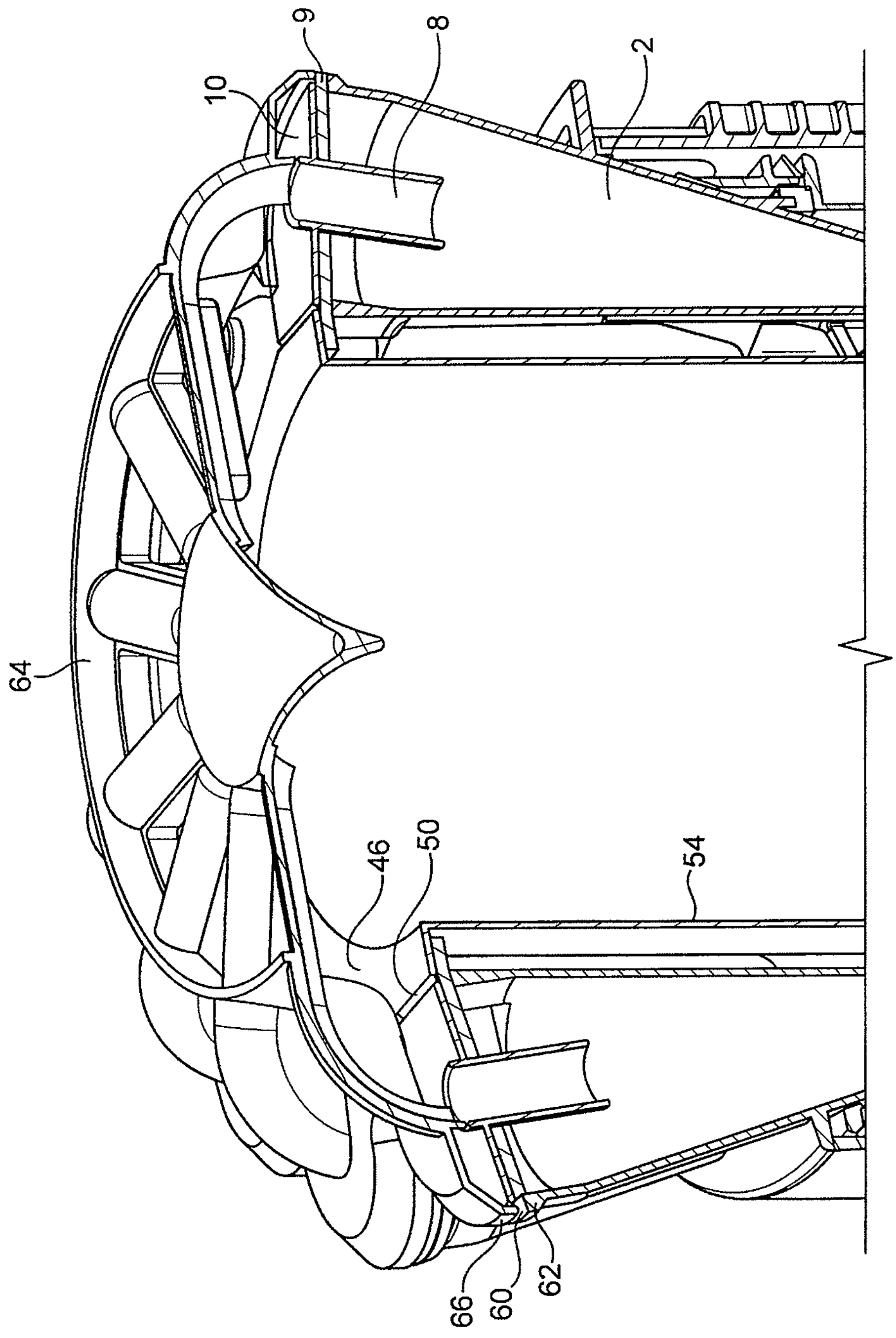

The next stage of the construction is shown in FIG. 6*d* and comprises placing an exhaust manifold 64 on top of the vortex finder plate 10. When the exhaust manifold 64 is placed on top of and is then fixed onto the remainder of the cyclonic separating apparatus 1 it causes the vortex finder support flaps 48 to flex about their hinges 50 until the vortex finder plate 10 makes a proper contact with and seals against the upper edges 14 of the cyclones 2. This vortex finder plate 10 is therefore very useful because it is very simple to manufacture and yet can still be used on inclined cyclones 2)

Figure 7A:
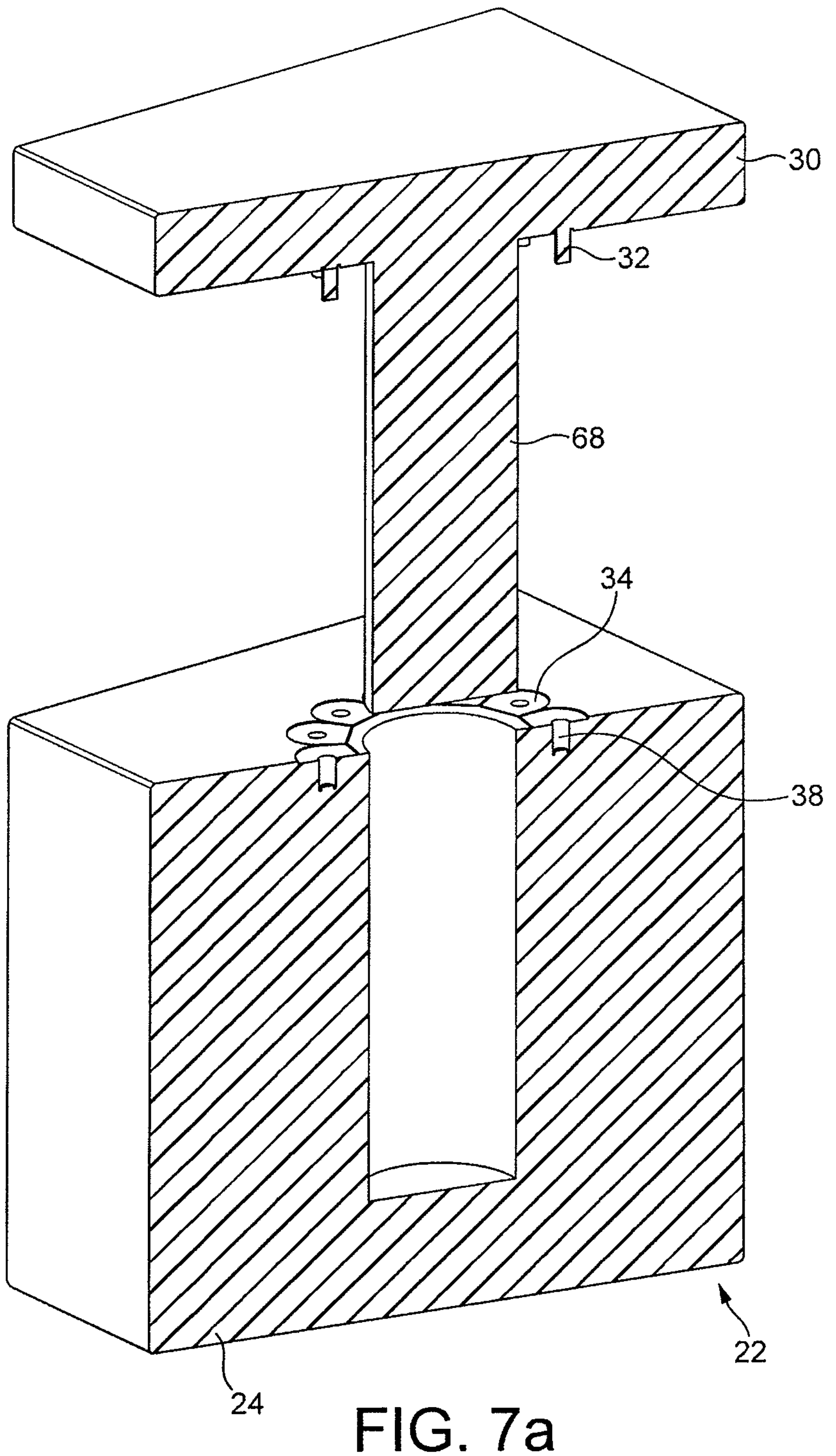
FIG. 7*a* shows an exploded schematic section through a tool for manufacturing the vortex finder plate shown in FIGS. 5*a* to 5*d*.
Figure 7B:
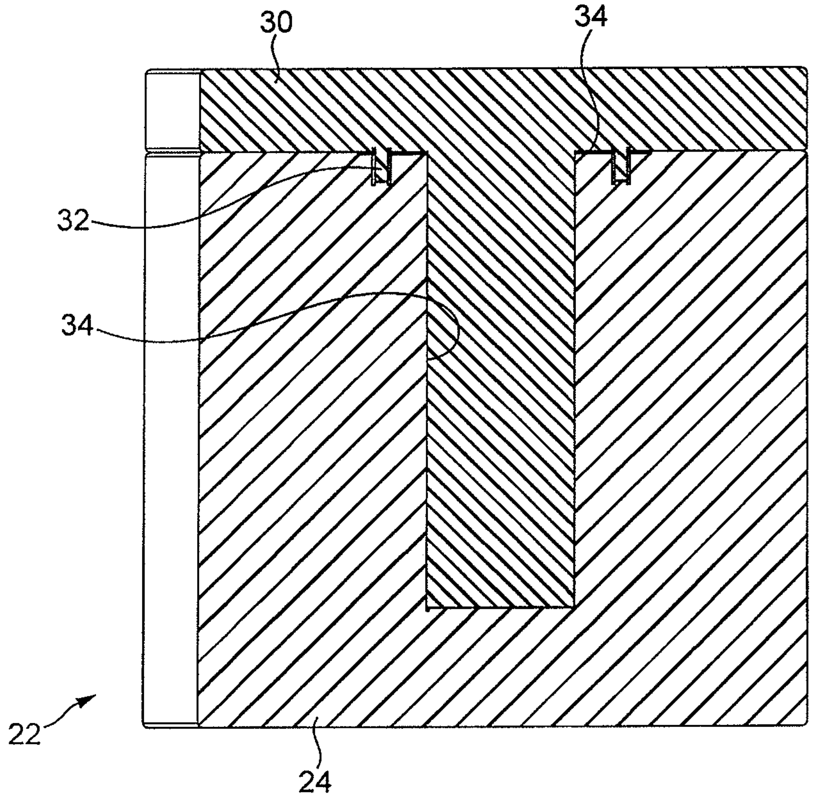
FIGS. 7*b* and 7*c* show the sequence of positions through which the tool must move to release a newly manufactured vortex finder plate as shown in FIGS. 5*a* to 5*d.*
Figure 7C:
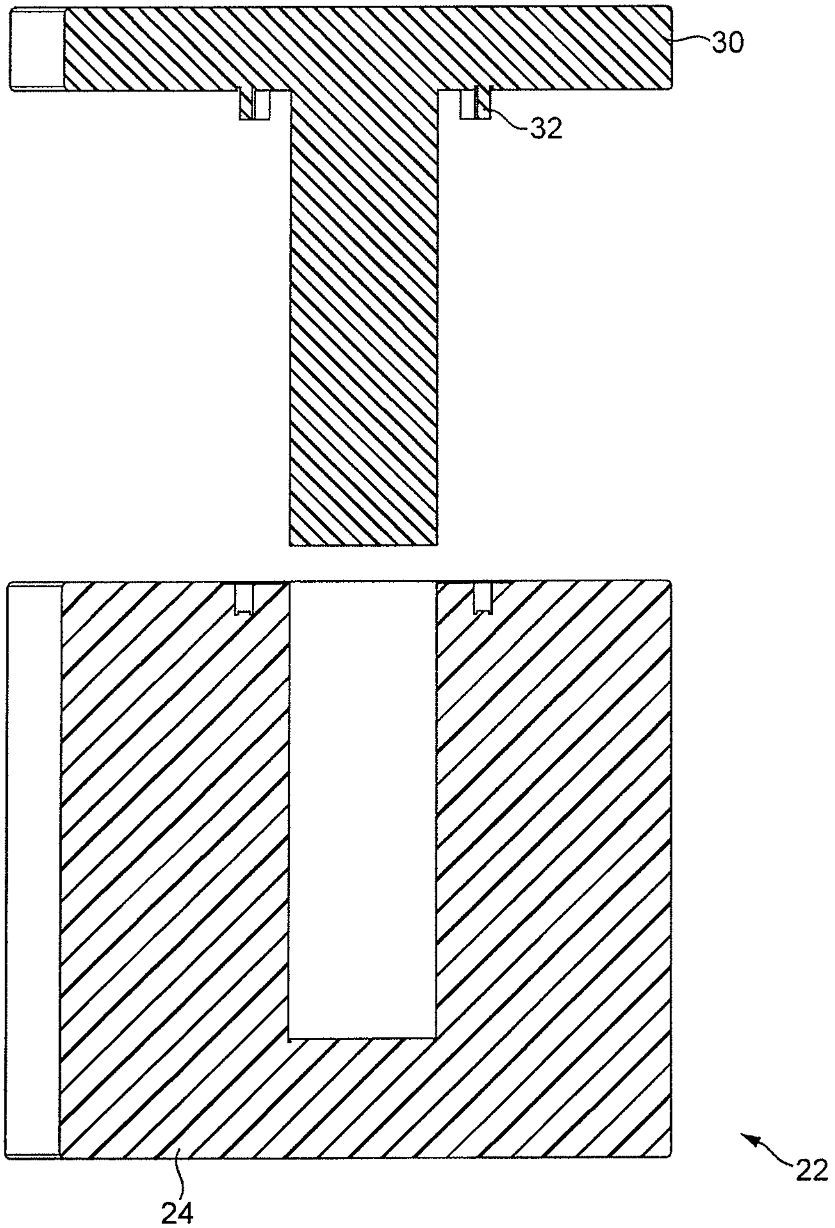

A tool 22 for making the second embodiment of the vortex finder plate 10 is shown in FIGS. 7*a* to 7*c*.

FIG. 7*a* shows an exploded view of the tool 22 which can be seen to comprise a lower core part 24 and an upper cavity part 30. The upper cavity part 30 comprises integral upper core pins 32 and an integral air duct forming portion 68. The vortex finder plate 10 can be made from simple up and down movements of these parts without the need for any separate core pins or lifter sections.

To manufacture this vortex finder plate 10, the lower core part 24 and the upper cavity part 30 are brought together to form a cavity 34 formed between the parts, this is the position shown in section in FIG. 7*b*. A molten plastics material is forced into the cavity 34, for example by injection molding. The molten plastics material is left to solidify to form the vortex finder plate 10. Once the vortex finder plate 10 has solidified within the cavity 34, it then has to be removed from the tool 22.

Unlike in the prior art where a complex sequence of movements is required to remove the vortex finder plate 10 the removal of this new vortex finder plate 10 is very simple. As can be seen in FIG. 7*c* the lower core part 24 and the upper cavity part 30 are simply pulled apart to release the vortex finder plate 10.

The invention claimed is:

1. A vortex finder plate for use in a cyclonic separating apparatus comprising, a support structure, and a plurality of vortex finder support flaps extending from the support structure, each vortex finder support flap comprising a vortex finder, and wherein at least one of the vortex finder support flaps is connected to the support structure by a hinge.

2. The vortex finder plate of claim 1, wherein each vortex finder support flap is connected to the support structure by a hinge.

3. The vortex finder plate of claim 1, wherein said hinge is an area of reduced thickness between a vortex finder support flap and the support structure.

4. The vortex finder plate of claim 1, wherein said hinge is in the form of a scored line between a vortex finder support flap and the support structure.

5. The vortex finder plate of claim 1, wherein said at least one of the vortex finder support flaps is able to move about said hinge between a first position in which the vortex finder support flap is in the same plane as the support structure and the vortex finder is at or substantially at 90 degrees to the support structure, and a second position in which the vortex finder support flap is at an angle to the support structure and the vortex finder is angled towards a central axis of the vortex finder plate.

6. The vortex finder plate of claim 5, wherein each vortex finder support flap is connected to the support structure by a respective hinge, and can move independently about its respective hinge between the first and second positions.

7. The vortex finder plate of claim 1, further comprising an air duct.

8. The vortex finder plate of claim 7, wherein the air duct extends downwardly from the center of the support structure.

9. The vortex finder plate of claim 1, wherein the vortex finder flaps, the support structure and the hinge are integrally formed as one piece.

10. The vortex finder plate of claim 1, wherein the vortex finder flaps, the support structure, the hinge and the vortex finders are integrally formed as one piece.

11. The vortex finder plate of claim 7, wherein the vortex finder flaps, the support structure, the hinge, the vortex finders and the air duct are integrally formed as one piece.

12. The vortex finder plate of claim 1, wherein the plurality of vortex finder support flaps extends outwardly from the support structure.

* * * * *